United States Patent [19]
Armetta et al.

[11] Patent Number: 5,864,830
[45] Date of Patent: Jan. 26, 1999

[54] DATA PROCESSING METHOD OF CONFIGURING AND MONITORING A SATELLITE SPENDING CARD LINKED TO A HOST CREDIT CARD

[76] Inventors: David Armetta, 510 Woodbine Rd., Stamford, Conn. 06903; David Tempest, 147 Hendrie Ave., Riverside, Conn. 06878

[21] Appl. No.: 799,543

[22] Filed: Feb. 13, 1997

[51] Int. Cl.⁶ .................................................. G06F 151/00
[52] U.S. Cl. ................................ 705/41; 705/39; 705/40; 705/41; 705/43; 705/44; 235/380; 379/144
[58] Field of Search ................................ 705/39, 40, 41, 705/43, 44; 235/380; 379/144

[56] References Cited

U.S. PATENT DOCUMENTS

| | | | |
|---|---|---|---|
| 4,256,955 | 3/1981 | Giraud et al. | 235/380 |
| 4,900,903 | 2/1990 | Wrighrt et al. | 235/380 |
| 5,155,342 | 10/1992 | Urano | 235/380 |
| 5,500,513 | 3/1996 | Langhans et al. | 235/380 |
| 5,613,012 | 3/1997 | Hoffman et al. | 382/115 |
| 5,614,703 | 3/1997 | Martin et al. | 235/382 |

FOREIGN PATENT DOCUMENTS

| | | | |
|---|---|---|---|
| 0540234A2 | 10/1992 | European Pat. Off. | 705/41 |
| 0725376A2 | 7/1996 | European Pat. Off. | 705/41 |

OTHER PUBLICATIONS

"Network Marketing Enters A New Era", Faulkner & Gray, Apr. 12, 1994, Dialog File#636, Accession No. 2322321.

Primary Examiner—Allen R. MacDonald
Assistant Examiner—Romain Jeanty
Attorney, Agent, or Firm—Cohen, Pontani, Lieberman & Pavane

[57] ABSTRACT

A data-processing method by which one or more prepaid satellite spending cards are configured and linked to a cardholder's host credit card or card account such that a predetermined available spending capacity of each satellite card is selectively determined by the cardholder of the host credit card, is deducted from the available balance of the host card or card account and limits the total spending capacity of the satellite card. The main cardholder may also remotely selectively increase the available spending capacity of the one or more satellite cards by deducting the desired additional spending capacity of each satellite card from the available balance of the host credit card as a purchase against the host card account.

10 Claims, 1 Drawing Sheet

DATA PROCESSING METHOD OF CONFIGURING AND MONITORING A SATELLITE SPENDING CARD LINKED TO A HOST CREDIT CARD

FIELD OF THE INVENTION

The present invention is directed to credit cards or bank cards and the like and, more particularly, to a method for configuring and linking one or more prepaid satellite spending cards to a cardholder's host credit card such that a predetermined available spending capacity of each satellite card is controlled by the cardholder of the host card and deducted from the balance of the host credit card.

BACKGROUND OF THE INVENTION

Credit cards—i.e. devices, most commonly represented by a plastic card-like member through the use of which an authorized cardholder pays for, by way of example, purchases of services and/or merchandise and the like—have become so universally well known and ubiquitous as to have fundamentally changed the very manner in which financial transactions and dealings are viewed and conducted in society today. Such credit cards are generally issued by a bank and provide a mechanism by which a cardholder purchases goods without an immediate, direct exchange of cash and thereby incurs debt which the cardholder may thereafter (i.e. upon receipt of a monthly or otherwise periodic statement) either fully pay the outstanding balance or, as a matter of necessity or choice, defer at least a portion of the balance for later payment with accompanying interest or finance charges for the period during which payment of the outstanding debt is deferred.

The spending power (i.e. the total amount of funds available to the cardholder at any particular time for making purchases and the like) of a credit card is typically limited to a particular amount (the "credit limit") predetermined by the issuer of the card. The size of the issuer-imposed credit limit is generally based on a number of nonexclusive factors, the most important of which are often the cardholder's earning capacity and the cardholder's credit history. When purchases are made or debts incurred with the credit card, the available portion of the credit limit is reduced by the purchase or debt amounts. In addition, interest and/or finance charges are also subtracted from the available portion of the credit limit on a periodic basis. The total debits on a credit card are referred to as the "outstanding balance", while the remaining or available balance of the credit limit is typically called the "available balance" and reflects the dynamically adjusted current spending power of the credit card. The cardholder may increase the available balance, up to the credit limit, by paying to the issuer (or its representative) the entire outstanding balance or a fractional portion thereof.

The cardholder may also optimally obtain from the issuer one or more secondary credit cards, as for example for family members, that are linked to the main credit card. The secondary credit cards are functionally identical to the main credit card in all respects and, indeed, typically bear the same account number and differ from the primary card only in the name of the person who is authorized to use the secondary card. Any purchases made using the secondary credit cards are debited against the credit limit of the main credit card or, put another way, against the single account in which the primary and secondary cards are issued. Thus, the main or primary cardholder has no control over the spending power or abilities of the secondary credit cards linked to his card, beyond the fact that the total of all debts incurred by all cards on the account cannot exceed the issuer-imposed credit limit. This arrangement is problematic because the secondary cardholders can quickly and undetectedly accumulate a significant outstanding balance on the main credit card account, thus reducing the main cardholder's spending power. Most importantly, the main cardholder does not know and is not automatically made aware of the purchases made by the secondary cardholder(s), and thus may be inconvenienced or embarrassed when seeking to use the main credit card to make a purchase. The main cardholder is notified of the purchases made by the secondary cardholders only when the periodic statement is received from the issuer. For example, if the main credit card's credit limit is $2,000 and the outstanding balance is $1,200, the main cardholder's remaining or current spending capacity is $800. If a secondary cardholder makes a $700 purchase, then the main credit card's spending capacity is suddenly reduced to $100 without the main cardholder's knowledge. This could present a particular problem where the main cardholder is intending to make a large or important purchase with the main credit card.

In recent years, several alternatives to credit cards have appeared—debit cards and stored value cards. A debit card is linked to the checking account of a cardholder; when the cardholder makes a purchase, the amount of that purchase is automatically deducted from the cardholder's checking account. This approach is problematic for several reasons. First, while credit card terminals are prevalent in most establishments, many debit cards require an additional, specially-configured terminal or a modification to an existing terminal, often at considerable expense to the merchant. Second, unlike a conventional credit card with which the cardholder has an option of paying for purchases over an extended period of time, debit card purchases are immediately deducted in full from the checking account and the cardholder's spending ability is limited to his currently available checking balance. This restricts the cardholder's ability to make large purchases. Third, debit cards are not profitable for issuers because there are no interest or finance charges, which serve as a primary source of an issuer's profit from credit cards. Most importantly, debit cards do not enjoy the functionality of credit cards in many business transactions. For example, renting a hotel room or a car typically requires a conventional credit card for security deposit purposes even if the ultimate balance is settled in cash. And unlike debit cards, credit cards may be used to make purchases by telephone, through the mail, or over the Internet.

A stored value card, on the other hand, is purchased from an issuer in a fixed amount. That amount is "stored" in a chip or magnetic stripe on the plastic card or substrate. When a cardholder makes a purchase, a card reader subtracts the amount of that purchase from the fixed amount currently on the card and writes the new balance to the card. This approach has a number of disadvantages. First, stored value cards require special readers that will not work with debit or credit cards. Because there is no common industry standard for stored value cards, a merchant might be required to acquire several terminals to process the stored value cards from different issuers. Second, stored value cards lack conventional credit cards' protection against theft or loss; losing a stored value card is the same as losing cash. Finally, as is the case with debit cards, stored value cards do not enjoy other advantages of credit cards, and thus cannot be used for security deposit purposes, or for ordering merchandise or services by telephone, mail, or over Internet.

It would thus be desirable to provide one or more prepaid satellite cards that are linked to a cardholder's host credit card such that a predetermined available spending capacity of each satellite card can be selectively determined by the cardholder of the host credit card and deducted from the available balance of the host card. It would further be desirable to provide a method for enabling the cardholder of the host credit card to remotely increase the available spending capacity of the one or more associated satellite cards by deducting the desired spending capacity of each satellite card from the available balance of the host credit card as a purchase.

Other objects and features of the present invention will become apparent from the following detailed description considered in conjunction with the accompanying drawing. It is to be understood, however, that the drawing is designed solely for purposes of illustration and not as a definition of the limits of the invention, for which reference should be made to the appended claims.

DETAILED DESCRIPTION OF THE PREFERRED EMBODIMENTS

Figure 1:
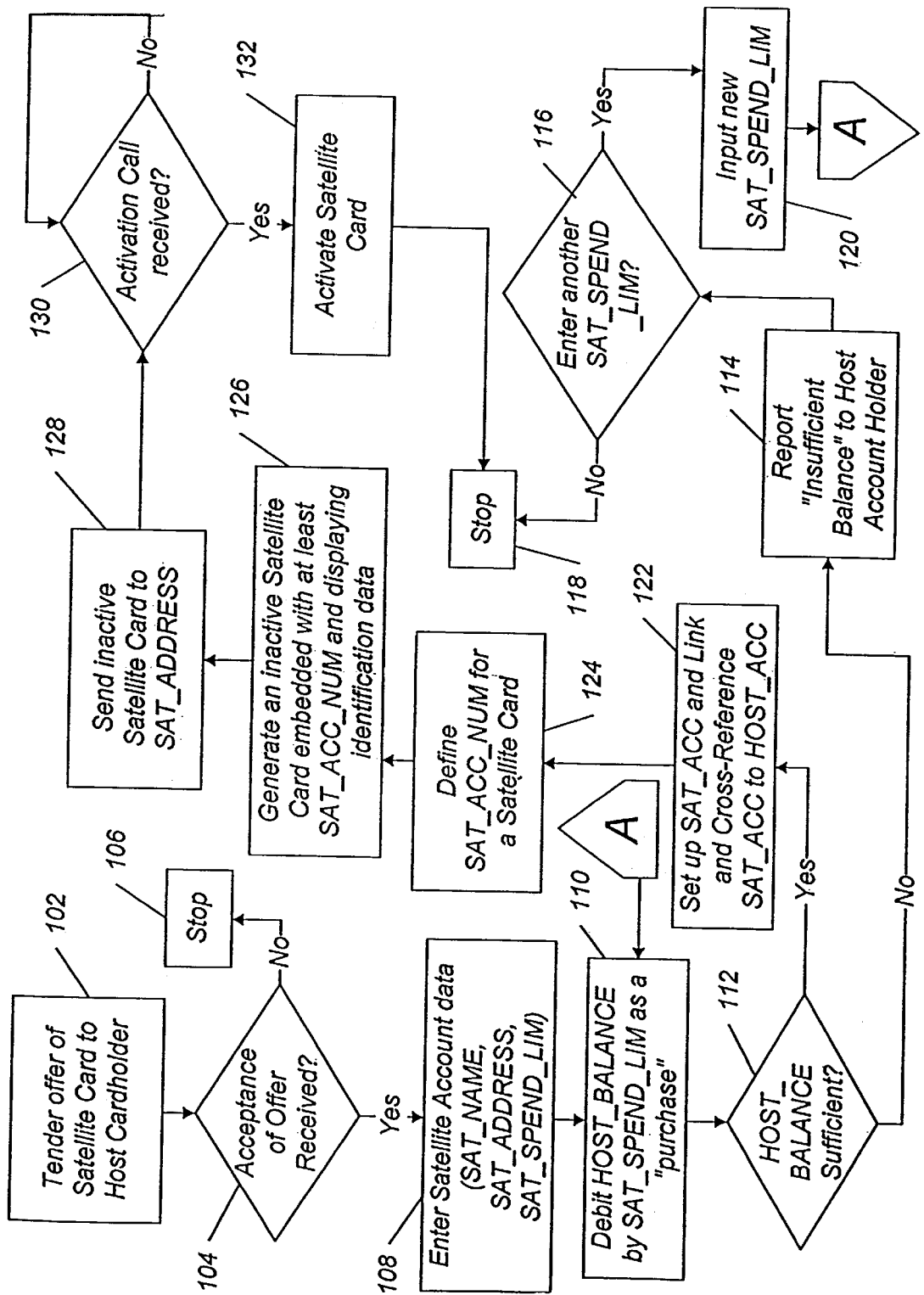
FIG. 1 is a flow chart depicting a data processing method implemented in accordance with the teachings of the present invention.

The present invention is broadly directed to a method for configuring and linking one or more prepaid satellite or secondary spending cards to a cardholder's main ("host") or primary credit card. Each of the primary and secondary cards is, except as otherwise described hereinabove, akin to a conventional credit card having all of the attributes and advantages and functionality of such cards. In accordance with the invention, a predetermined available spending capacity of each satellite card is selectively determined by the cardholder of the host credit card and that capacity amount is deducted from the available balance of the host credit card in the manner of a purchase made with the host card. The spending capacity of each satellite card may be selectively adjusted remotely by the cardholder of the host credit card ("host cardholder"), and the additional desired spending capacity of each satellite card is likewise deducted from the available balance of the host credit card. Thus, although it is generally intended that the satellite card be used only once—i.e. until the predetermined spending limit is met or exhausted—following which the satellite card may be discarded, it may also be reused or "recharged" by selective addition of further credit amounts to the card by the host cardholder. All spending activity on the satellite card appears on a periodic satellite card statement which may be sent to the host cardholder, to the satellite cardholder, or to both. A record of all adjustments to the available spending capacity of each satellite card appears on the periodic host credit card statement as "purchases" against the host card account, although it is optional as to whether the host cardholder is informed on the host statement as to the satellite card holder's use(s) of the satellite card.

A satellite card in accordance with the present invention has several distinct advantages over debit cards and stored value cards. First, a satellite card is a credit card for all practical purposes and thus enjoys the many advantages of a credit card. For example, a satellite card may be used when a security deposit is required or when making a purchase by telephone, mail, or the over Internet. It may also be read and processed by existing credit card terminals. Finally, the satellite card enjoys the same protections against theft or loss as the host credit card.

A satellite card also has a significant advantage over a typical "additional cardholder" credit card that is associated with the account of a host or primary credit card. Because the spending capacity of a satellite card is selectively pre-determined by the host card holder and reduces the available balance of the host credit card, the satellite cardholders' spending capacity is predeterminedly limited. Thus, the host cardholder can protect himself from unexpected or undesired reductions in the host credit card's available balance. If necessary, the host cardholder can selectively add to or increase the spending capacity of the satellite card at any time simply by contacting the issuer via phone, mail, the Internet or any other mutually acceptable alternative and authorizing the desired increase.

Some of the significant advantages of a satellite card in accordance with the invention will perhaps be better understood and appreciated by reference to the following example. A common dilemma for parents is how to provide money to a child going away to college. Cash and checks lack the advantages of a credit card in that they are irreplaceable if lost or stolen. Likewise, if a child runs out of money it may be difficult to quickly transfer additional funds to the child. On the other hand, giving the child a typical "additional cardholder" secondary credit card is problematic because there is no way to control the child's spending. The satellite card of the invention provides an ideal solution because the child may enjoy all of the benefits of a conventional credit card with a spending capacity that is directly controlled by the parents. If necessary, the parents may easily increase (or decrease) the satellite card's spending capacity remotely and at will. Furthermore, the parents may be kept aware of the child's spending habits by examining the periodic satellite card statement where the statement includes such information.

The functionality of a satellite card also enable its use as a gift in lieu of cash, check, or gift certificate. For example, if the host cardholder does not have enough available funds to make a cash or check gift, the cardholder can instead give a satellite card having a one-time, predetermined spending limit charged against the host credit card. Furthermore, because the satellite card can only be used by the true cardholder (in the manner of a conventional credit card) and therefore enjoys a credit card's normal protection against theft or loss; the gift is accordingly orders of magnitude more secure than cash or a check.

Finally, the host cardholder may obtain a satellite card for him- or herself to assist in budgeting of personal expenses for a trip or other occasion, or to otherwise control his or her spending.

With the foregoing overview in mind, the following more detailed discussion of the operation of the preferred embodiment of the inventive method—at least the major portion of which is generally contemplated as being implemented in or on an automated data processing system of conventional construction or otherwise provided or prepared in accordance with the normal abilities of those skilled in the pertinent arts—will best be understood by reference to the flow chart of FIG. 1. While the method shown in FIG. 1 specifically refers to only a single satellite card, it should be understood that the method may be readily adapted by one skilled in the art to configure and link multiple satellite cards to a host credit card. For example, the method of the present invention may be practiced multiple times sequentially where the host cardholder intends to or does in fact purchase or authorize more than one satellite card. Furthermore, the normal data processing methods and techniques of credit card transactions, such as recording individual purchases made with a credit card and issuing to the cardholder periodic statements containing information about the previous period's financial transactions, are well known and will not therefore be described in unnecessary detail.

With particular reference, then, to the flow chart of FIG. 1, at block 102 an offer to purchase a satellite card may be tendered by the issuer to a host cardholder. As an alternative, a host cardholder already familiar with the availability of satellite cards may simply request that one be issued in his or her account to a named individual. In any event, at block 104 the host cardholder decides whether to accept the tendered offer or otherwise request issuance of a satellite card. If the host cardholder accepts the offer, then the flow proceeds to block 108. Otherwise, the process ends at block 106.

At block 108, configuration data for the satellite card is obtained from the host cardholder and is stored as a grouping or collection or table of variables by the data processing system. The configuration data includes, without limitation, the name of the satellite cardholder ("SAT_NAME"), the address of the satellite cardholder ("SAT_ADDRESS"), and the desired spending capacity of the satellite card ("SAT_SPEND_LIM"). Other pertinent information typically stored or maintained by credit card issuers and the like with respect to card holders may also be obtained and stored at step 108. It should be understood that if the host cardholder is purchasing the satellite card for his or her own personal use, then the SAT_NAME and SAT_ADDRESS data will be identical to the corresponding host credit card information already stored by the data processing system in connection with the host card or amount.

At block 110, the available balance of the host credit card ("HOST_BALANCE") is debited by the SAT_SPEND_LIM data as a purchase. As a result, the creation or issuance of the satellite card will appear as a purchase on the next periodic statement of the host credit card. At block 112, a determination is made whether the HOST_BALANCE is sufficient to authorize a purchase in the amount of the designated SAT_SPEND_LIM. If the response is negative, then at block 114 the cardholder is informed that the HOST_BALANCE is insufficient for the desired SAT_SPEND_LIM. At block 116 the host cardholder is next given the option of entering a new SAT_SPEND_LIM. If the host cardholder decides not to enter a new SAT_SPEND_LIM then flow stops at block 118. Otherwise, a new SAT_SPEND_LIM is entered at block 120, and flow returns to block 110 where the HOST_BALANCE is debited by the new SAT_SPEND_LIM. Where it is desired to add additional funds to an existing satellite card, a procedure similar to that shown at blocks 112–120 may be used to add a predetermined amount to the SAT_SPEND_LIM by debiting the predetermined amount from the HOST_BALANCE and then re-adjusting the designated predetermined amount or aborting the process if the HOST_BALANCE is insufficient.

If at block 112 the response is positive, then flow proceeds to block 122 where a satellite card account ("SAT_ACC") is set up and linked to and cross-referenced with the host credit card account ("HOST_ACC"). The SAT_ACC variable stores all configuration data relating to the satellite card entered at block 108. This arrangement enables the host cardholder to easily increase the SAT_SPEND_LIM by contacting the issuer via, for example, a telephone, mail, or over the Internet and authorizing the amount of the SAT_SPEND_LIM increase to be debited to the HOST_ACC.

At block 124 a satellite account number ("SAT_ACC_NUM") is defined to identify the particular satellite card being created or purchased. The SAT_ACC_NUM is associated with the SAT_ACC and is stored with other configuration data. For example, if the host cardholder has purchased several satellite cards, each will have a unique SAT_ACC_NUM.

At block 126 an "inactive" satellite card is generated. Because the card is inactive, it may not be used until the satellite cardholder receives and activates the card. This discourages theft of the new satellite card as is passes through the mail. The satellite card is preferably provided with cardholder identification data, such as SAT_NAME and a magnetic strip or other data storage means for storing at least the SAT_ACC_NUM. Preferably, the satellite card has a substantially similar structure to that of the host credit card. For example, the SAT_ACC_NUM may be displayed on the front of the card, and a signature panel for the satellite cardholder's signature mounted on the back of the card. In addition, a contact telephone number for the issuer may be also displayed on the back of the card.

At block 128, the inactive satellite card is mailed to the SAT_ADDRESS. Alternatively, the inactive card may be mailed to the host cardholder for distribution to the satellite user, or the host cardholder or the designated satellite cardholder may pick up the inactive satellite card at a pre-determined location such as a branch of an issuing bank.

If the satellite card is mailed, at block 130 the data processing system waits for an activation call from the satellite cardholder. An activation call typically consists of a cardholder calling the issuer and verifying that the satellite card was received. If an activation call is received, then at block 132 the satellite card is activated and is thereafter ready for use. The flow stops at block 118.

Purchases made using the satellite card appear on a periodic satellite card statement issued by the card issuer. At the option of the host cardholder the satellite card statement may be sent to the satellite cardholder, the host cardholder (in which case it may be incorporated into the host credit card statement) or to both.

Thus, while there have been shown and described and pointed out fundamental novel features of the invention as applied to a preferred embodiment thereof, it will be understood that various omissions and substitutions and changes in the form and details of the invention, as herein disclosed, may be made by those skilled in the art without departing from the spirit of the invention. It is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A data processing method of configuring a satellite spending card linked to a host credit card and issued by an issuer, the host credit card being held by a host cardholder and having an available balance defined in an associated host account data processing record of a data processing device, a predetermined spending capacity of the satellite card being selectively determined by the host cardholder, comprising the steps of:

(a) entering, into a data processing device, configuration data comprising an identifier of a satellite cardholder of a satellite card and a host cardholder-determined spending capacity of the satellite card;

(b) subtracting, in the data processing device, the entered spending capacity of the satellite card from the available balance of the host credit card;

(c) storing, in a satellite account record in the data processing device, the configuration data entered in said step (a);

(d) linking, in the data processing device, the satellite account record to the host account record to facilitate future transfers of funds from the host account record to the satellite account record;

(e) defining a satellite account number associated with the satellite account for use in financial transactions carried out with the satellite card and limited in total amount to the satellite card spending capacity;

(f) issuing the satellite card having means for storing on the satellite card the satellite account number so that each purchase made with the satellite card by the satellite cardholder is debited from the satellite card spending capacity, and means on the card for displaying at least a portion of the configuration data sufficient to identify the satellite cardholder so that only the satellite cardholder identified on the satellite card can use the satellite card for financial transactions in a total amount limited by the satellite card spending capacity; and (g) tendering the satellite card to the satellite cardholder for use by satellite cardholder in carrying out financial transactions with the satellite card and limited in total amount to the satellite card spending capacity.

2. The data processing method of claim 1, further comprising the steps of:

(h) before said step (a), tendering to the host cardholder an offer to provide the satellite card to a satellite cardholder; and (i) following acceptance by the host cardholder of the tendered offer, performing said step (a).

3. The data processing method of claim 1, wherein the configuration data comprises a name of the satellite cardholder.

4. The data processing method of claim 3, wherein said step (n)(1) comprises one of contacting the issuer via telephone, contacting the issuer via mail, and contacting the issuer over an Internet connection.

5. The data processing method of claim 1, further comprising the step of:

(j) following said step (b) and before said step (c), determining, in the data processing device, whether the host card available balance is sufficient to accommodate the host cardholder-determined spending capacity of the satellite card, and, when the host card available balance is not sufficient:

(1) informing the host cardholder that the available balance is insufficient, (2) determining whether a new host cardholder-determined satellite card spending capacity is to be entered, (3) entering, into the data processing device, a new satellite card spending capacity and repeating said step (b) when a new satellite card spending capacity is entered.

6. The data processing method of claim 1, further comprising the steps of (k) after said step (f), and before said step (g), causing the satellite card to be inactive such that the satellite card may not be used in any financial transaction;

(l) after said step (g), awaiting confirmation from the satellite cardholder that the inactive satellite card has been received; and (m) activating the satellite card after receipt of the confirmation awaited in said step (l).

7. The data processing method of claim 1, further comprising the step of:

(n) adding an additional predefined amount to the satellite card spending capacity by the host cardholder, by:

(1) contacting by the host cardholder the issuer of the host credit card to authorize addition of a host cardholder-determined additional amount of spending capacity to the satellite card;

(2) entering, into the data processing device, the additional amount;

(3) subtracting, in the data processing device, the additional amount from the host credit card available balance; and (4) adding the additional amount to the satellite card spending capacity.

8. The data processing method of claim 1, further comprising the step of:

(o) recording in the data processing device each financial transaction made by the satellite cardholder using the satellite card in the satellite account record and identifying a time period during which the transaction was made.

9. The data processing method of claim 8, wherein each said financial transaction comprises one of a purchase amount and a credit amount, further comprising the step of:

(p) adjusting the satellite card spending capacity by:

(1) subtracting each purchase amount from the satellite card spending capacity, and (2) adding each credit amount to the satellite card spending capacity.

10. The data processing method of claim 8, further comprising the steps of:

(q) generating in the data processing device a periodic satellite account statement showing financial transactions made in a previous period using the satellite card; and (r) forwarding the generated periodic satellite account statement to at least one of the host cardholder and the satellite cardholder.

* * * * *